US012181560B2

(12) United States Patent
Miyahara (10) Patent No.: US 12,181,560 B2
(45) Date of Patent: Dec. 31, 2024

(54) METHOD AND DEVICE FOR TRACKING A MOVABLE TARGET (71) Applicant: Great Wall Motor Company Limited, Baoding (CN)

(72) Inventor: Shunji Miyahara, Baoding (CN)

(73) Assignee: Great Wall Motor Company Limited, Baoding (CN)

( * ) Notice: Subject to any disclaimer, the term of this patent is extended or adjusted under 35 U.S.C. 154(b) by 353 days.

(21) Appl. No.: 16/763,164

(22) PCT Filed: Nov. 9, 2018

(86) PCT No.: PCT/CN2018/114784
§ 371 (c)(1),
(2) Date: May 11, 2020

(87) PCT Pub. No.: WO2019/091448
PCT Pub. Date: May 16, 2019

(65) Prior Publication Data
US 2021/0405175 A1  Dec. 30, 2021

(30) Foreign Application Priority Data
Nov. 10, 2017 (CN) .......................... 201711107046.3

(51) Int. Cl.
*G01S 13/52* (2006.01)
*G01S 7/41* (2006.01)
*G01S 13/06* (2006.01)
(52) U.S. Cl.
CPC .............. *G01S 13/52* (2013.01); *G01S 7/415* (2013.01); *G01S 13/06* (2013.01)
(58) Field of Classification Search
CPC .......... G01S 13/52; G01S 7/415; G01S 13/06; G01S 13/44; G01S 13/58; G01S 2013/93271; G01S 13/931; G01S 13/723
(Continued)

(56) References Cited

U.S. PATENT DOCUMENTS 5,684,490 A   11/1997  Young et al.
6,025,797 A   2/2000   Kawai et al.
(Continued)

FOREIGN PATENT DOCUMENTS

CN   101561501 A   * 10/2009
CN   102253391 A     11/2011
(Continued)

OTHER PUBLICATIONS

IEEE International Radar Conference "Tracking Wild Maneuvers at Low Data-Rate, Using Curved-Track State Parameters" 2000.
(Continued)

*Primary Examiner* — Olumide Ajibade Akonai
*Assistant Examiner* — Yonghong Li
(74) *Attorney, Agent, or Firm* — Volpe Koenig (57) ABSTRACT

A method and device for tracking a movable target, relating to the technical field of tracking. In the situation where a tracked movable target travels at a low speed or stops traveling, whether the target is a stationary object or a tracked movable target can still be identified. The method for tracking a movable target comprises: acquiring radar monitoring data of all radar monitoring targets; extracting lateral position data of each radar monitoring target from the radar monitoring data; determining a lateral position change of each radar monitoring target according to the extracted lateral position data; and when the lateral position change of one or more radar monitoring targets from among all the radar monitoring targets is greater than a pre-set threshold value, determining that the one or more radar monitoring targets are tracked movable targets.

4 Claims, 7 Drawing Sheets (58) Field of Classification Search
USPC .......................................................... 342/350
See application file for complete search history.

(56) References Cited

U.S. PATENT DOCUMENTS

| | | | | |
|---|---|---|---|---|
| 6,198,426 | B1 * | 3/2001 | Tamatsu | G01S 13/931 |
| | | | | 342/72 |
| 6,317,073 | B1 * | 11/2001 | Tamatsu | G01S 13/44 |
| | | | | 342/128 |
| 8,446,312 | B2 * | 5/2013 | Kanamoto | G01S 13/04 |
| | | | | 342/149 |
| 9,110,164 | B2 * | 8/2015 | Moriuchi | G01S 13/931 |
| 9,123,252 | B2 * | 9/2015 | Nagata | B60W 30/143 |
| 2010/0033371 | A1 | 2/2010 | Kumagai et al. | |
| 2011/0264301 | A1 | 10/2011 | Henken et al. | |
| 2013/0257640 | A1 | 10/2013 | de Wilde et al. | |
| 2013/0335569 | A1 | 12/2013 | Einecke et al. | |
| 2016/0084943 | A1 * | 3/2016 | Arage | G01S 13/726 |
| | | | | 342/102 |
| 2016/0263157 | A1 | 9/2016 | Day et al. | |
| 2017/0102459 | A1 * | 4/2017 | Sakamoto | G01S 7/40 |

FOREIGN PATENT DOCUMENTS

| | | | | |
|---|---|---|---|---|
| CN | 102903125 | A * | 1/2013 | |
| CN | 103033808 | A | 4/2013 | |
| CN | 103229071 | A * | 7/2013 | ........... G01S 13/003 |
| CN | 203740018 | U | 7/2014 | |
| CN | 104101878 | A | 10/2014 | |
| CN | 104168444 | A | 11/2014 | |
| CN | 104575101 | A | 4/2015 | |
| CN | 104619562 | A | 5/2015 | |
| CN | 104899557 | A | 9/2015 | |
| CN | 105866779 | A * | 8/2016 | ............ G01S 13/93 |
| CN | 105928531 | A | 9/2016 | |
| CN | 106054191 | A | 10/2016 | |
| CN | 106199580 | A | 12/2016 | |
| CN | 106443661 | A | 2/2017 | |
| CN | 106715212 | A | 5/2017 | |
| CN | 106794840 | A | 5/2017 | |
| CN | 107054458 | A | 8/2017 | |
| CN | 107085424 | A | 8/2017 | |
| CN | 107123173 | A | 9/2017 | |
| CN | 107240299 | A | 10/2017 | |
| DE | 10 2016 106299 | A1 | 10/2016 | |
| JP | 2000011300 | A * | 1/2000 | |
| JP | 3411866 | B2 | 6/2003 | |
| JP | 5704239 | B2 | 4/2015 | |
| WO | 2012113366 | A1 | 8/2012 | |
| WO | WO-2016118791 | A1 * | 7/2016 | ............... G01D 5/12 |

OTHER PUBLICATIONS

Journal of Detection & Control "Forward Detection for Bistatic Sonar Based on the Babinefs Principle" Apr. 2010, © 1994-2014 China Academic Journal Electronic Publishing House. All rights reserved. http://www.cnki.net. English Abstract attached.

"Research on safety assistant driving system of snow sweeper based on multi-information fusion" Nov. 1, 2009. English Abstract attached.

* cited by examiner

METHOD AND DEVICE FOR TRACKING A MOVABLE TARGET

CROSS REFERENCE TO RELATED APPLICATIONS

This application is a 35 USC § 371 national stage of PCT/CN2018/114784, which was filed Nov. 9, 2018, claims priority to Chinese Application No. 201711107046.3, filed on Nov. 10, 2017, and is entitled "METHOD AND DEVICE FOR TRACKING MOVABLE TARGET," both of which are incorporated herein by reference as if fully set forth.

FIELD OF THE INVENTION

The present invention relates to the technical field of tracking, in particular to a method and device for tracking a movable target.

BACKGROUND OF THE INVENTION

At present, radar is adopted by a vehicle tracking system such as an advanced driver assistance system (ADAS) for tracking vehicles. However, when a tracked vehicle travels at a low speed or temporarily stops traveling due to red lights or other reasons, whether the tracked vehicle which travels at a low speed or temporarily stops traveling is a stationary object or a tracked vehicle cannot be identified through existing tracking technologies.

SUMMARY OF THE INVENTION

In view of this, the present invention aims to provide a method and device for tracking a movable target, and therefore whether a tracked movable target is a stationary object or a tracked movable target can still be identified when the tracked movable target travels at a low speed or stops traveling temporarily.

In order to achieve the above aim, the technical solution of the present invention is realized as follows.

A method for tracking a movable target, comprising:
acquiring radar monitoring data of all radar monitoring targets;
extracting lateral position data of each radar monitoring target from the radar monitoring data;
determining a lateral position change of each radar monitoring targets according to the extracted lateral position data; and
determining that one or more radar monitoring targets of all the radar monitoring targets are tracked movable targets, when the lateral position changes of the one or more radar monitoring targets is greater than a preset threshold.

Further, the determining a lateral position changes of each radar monitoring target according to the extracted lateral position data comprising:
performing frequency domain transformation on the extracted lateral position data; and
determining an average value of lateral position changes of each radar monitoring target in a preset frequency band after the frequency domain transformation.

Further, the determining an average value of lateral position changes of each radar monitoring target in a preset frequency band after the frequency domain transformation comprising:
determining an average value of lateral position changes of each radar monitoring target in multiple preset frequency bands after the frequency domain transformation.

Further, the determining a lateral position changes of each radar monitoring target according to the extracted lateral position data comprising:
performing time domain filtering on the extracted lateral position data; and
determining an average value of lateral position changes of each radar monitoring target within a preset time period after the time domain filtering.

An embodiments of the present invention provides a device for tracking a movable target, comprising:
an acquiring module, used for acquiring radar monitoring data of all radar monitoring targets;
an extracting module, used for extracting lateral position data of each radar monitoring target from the radar monitoring data;
a lateral position change determining module, used for determining a lateral position change of each radar monitoring target according to the extracted lateral position data; and
a movable target determining module, used for determining that some radar monitoring targets of all the radar monitoring targets are tracked movable targets when the lateral position changes of the some radar monitoring targets are greater than a preset threshold.

Further, the lateral position change determining module comprising:
a frequency domain transformation sub-module, used for performing frequency domain transformation on the lateral position data extracted by the extracting module; and
a first lateral position change average value determining sub-module, used for determining an average value of lateral position changes of each radar monitoring target in a preset frequency band after the frequency domain transformation.

Further, the first lateral position change average value determining sub-module is further used for: determining an average value of lateral position changes of each radar monitoring target in multiple preset frequency bands after the frequency domain transformation.

Further, the lateral position change determining module comprising:
a time domain filtering sub-module, used for performing time domain filtering on the lateral position data extracted by the extracting module; and
a second lateral position change average value determining sub-module, used for determining an average value of lateral position changes of each radar monitoring target within a preset time period after the time domain filtering.

An embodiment of the present invention further provides a machine-readable storage medium for storing instructions which are used for enabling a machine to perform the above method for tracking the movable target.

An embodiment of the present invention further provides a processor, being used to run a program, wherein the above method for tracking the movable target is performed when the program is executed.

Compared with the prior art, the technical solution of the present invention has the following advantages: since the lateral distribution of reflection points of movable targets to radar waves is wide, whether the radar monitoring targets are movable targets or stationary objects can be accurately determined by extracting the lateral position data of all the radar monitoring targets from the radar monitoring data, determining the lateral position change of each radar monitoring target according to the extracted lateral position data and comparing the lateral position change with a preset threshold. In this way, when the technical solution is applied to a tracking field such as vehicle tracking, it is possible to accurately determine whether a vehicle should continue to wait until an ahead target starts to move within a reasonable time or detour.

BRIEF DESCRIPTION OF DRAWINGS

The accompanying drawings constituting a part of the present invention are used to provide further understanding of the present invention. The exemplary embodiments and descriptions thereof are used to explain the present invention, and do not constitute an undue limitation on the present invention. In the accompanying drawings.

BRIEF DESCRIPTION OF THE SYMBOLS

901—Acquiring module, 902—Extracting module, 903—Lateral position change determining module, 904—Movable target determining module, 903a—Frequency domain transformation sub-module, 903b—First lateral position change average value determining sub-module, 903c—Time domain filtering sub-module, and 903d—Second lateral position change average value determining sub-module.

DETAILED DESCRIPTION OF THE EMBODIMENTS

It should be noted that the embodiments in the present invention and the features in the embodiments can be combined with each other in the case of no confliction.

In addition, the longitudinal direction mentioned in the embodiments of the present invention refers to the traveling direction of a tracked target, and the lateral direction refers to the direction perpendicular to the traveling direction of the tracked target.

Figure 1A:
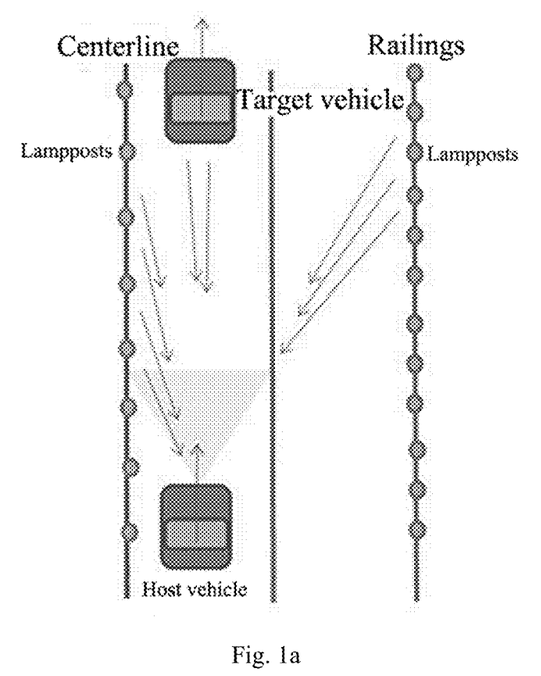
FIGS. 1a-1d are schematic diagrams of stationary objects and a tracked vehicle in a lane.
Figure 1B:
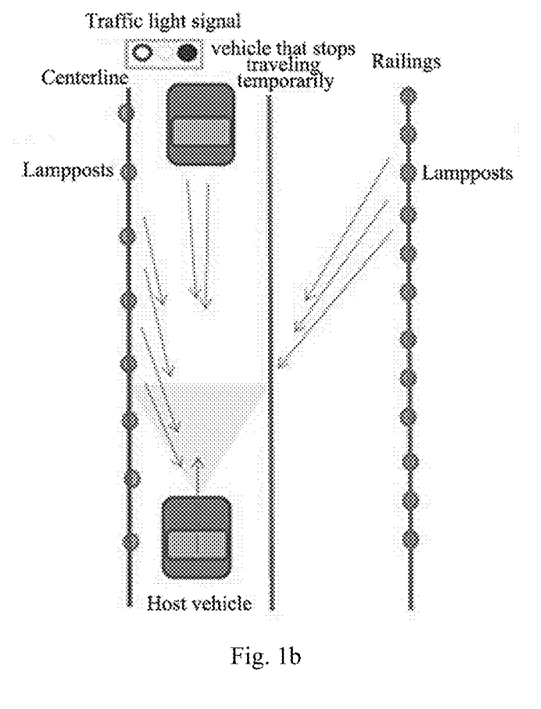
Figure 1C:
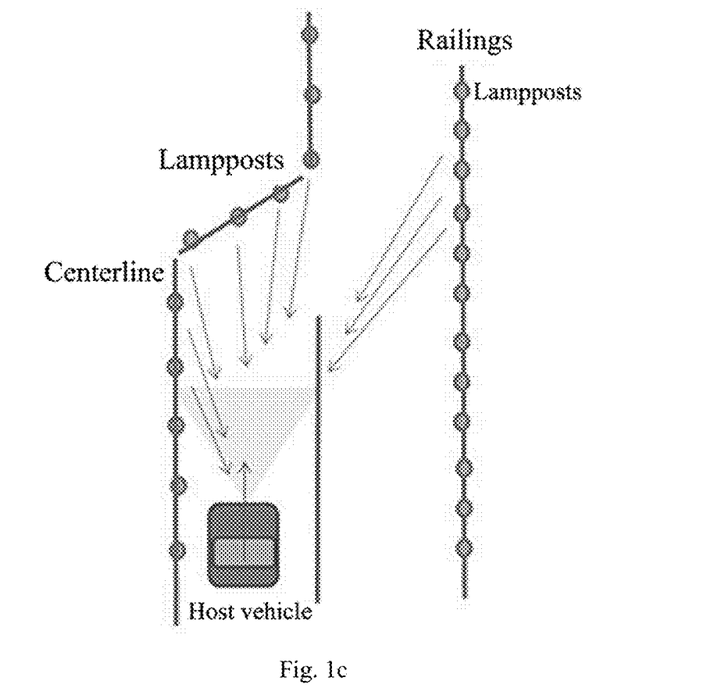
Figure 1D:
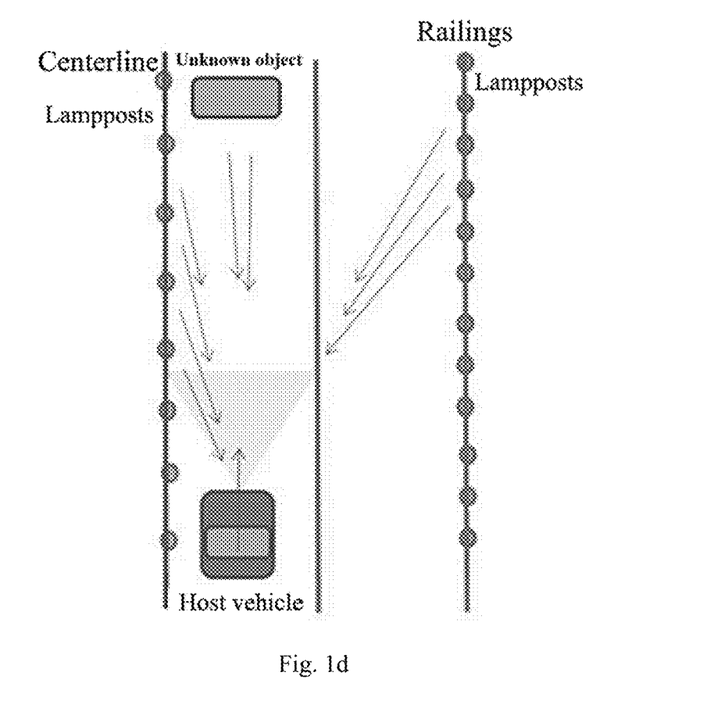

The inventor of the present invention found that in an existing radar-based vehicle tracking system, radar separately measures the distance and speed of a vehicle, and tracks the target vehicle through the measured distance and speed. Therefore, the existing radar-based vehicle tracking system has the following problems:

(1) because there are many stationary objects on both sides of a lane (as shown in FIG. 1a), such as lampposts, railings, curbstone and fences, the radar tracking processing speed is lowered; and (2) when the tracked vehicle stops traveling or travels at a low speed due to red lights (as shown in FIG. 1b), termination of the current lane (as shown in FIG. 1c), an unknown object appearing on the current lane (as shown in FIG. 1d) and other conditions, existing radar-based vehicle tracking systems cannot determine whether the detected target in front is the tracked vehicle that stops traveling or a stationary object in the lane, and thus cannot determine whether the vehicle should continue to wait until the target in front starts to move within a reasonable time or detour, wherein in FIGS. 1a to 1d, triangular areas represent radar wave emission areas, and arrows pointing to host vehicles represent reflected waves from targets in front.

Figure 2A:
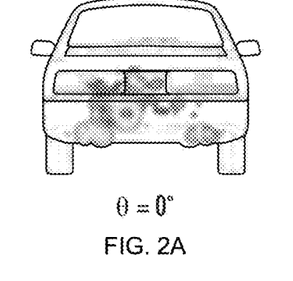
FIGS. 2a-2c are schematic diagrams of the lateral distribution of reflection points of a tracked vehicle to radar waves.
Figure 2B:
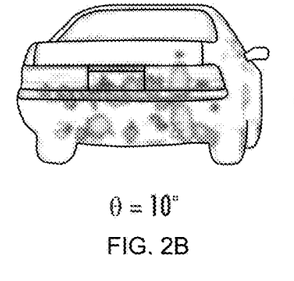
Figure 2C:
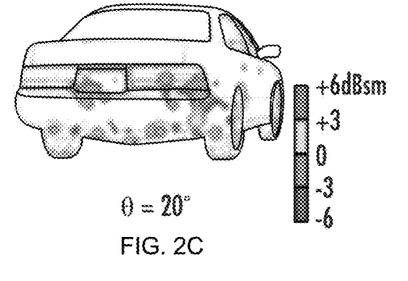
Figure 3:
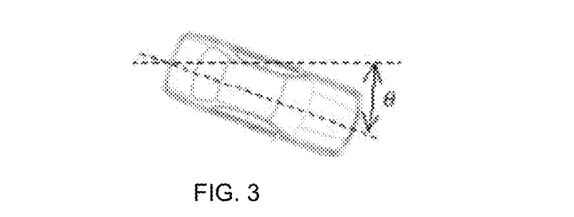
FIG. 3 is a schematic diagram of an angle θ in FIGS. 2a-2c.

The inventor of the present invention also found that reflection points of a tracked vehicle to radar waves are widely distributed behind the tracked vehicle, and the reflection points of the tracked vehicle to radar waves are extensive laterally and are generally greater than 1 m laterally. FIGS. 2a to 2c show the reflection features of the tracked vehicle to radar waves when θ is 0°, 10° and 20° respectively. The legend on the right side of FIG. 2c shows the size of the radar cross section. Wherein, θ refers to the angle between the traveling direction of the tracked vehicle and the direction of the head of the tracked vehicle, as shown in FIG. 3. The reason for the wide distribution is that the wavelength of radar waves is on the order of millimeters, such as 3.9 mm, and the width of the tracked vehicle is on the order of meters, such as 1.8 m, and then the ratio between the width of the tracked vehicle to the radar waves is about 461.5. In addition, the wide lateral distribution is not deterministic, but has statistical characteristics. Unlike the tracked vehicle, the diameters of lampposts on the two sides of the lane are about 0.1 m, so that the lateral distribution of the reflection points of the lampposts to the radar waves is less than 0.1 m, that is, the reflection points of the lampposts to the radar waves are quite narrow laterally. Therefore, it will be very advantageous if the lateral distribution of the reflection points to radar waves can be used to identify the tracked vehicle from the stationary object.

The inventor of the present invention also found that in the case where the frequency of radar waves is 77 GHz and the wavelength is 3.9 mm, the range of the radar cross section (RCS) of the tracked vehicle is −6 to +6 dBsm; according to the formula $$\sigma_{max} = 10\lg\frac{2\pi r h^2}{\lambda},$$

wherein $\sigma_{max}$ represents the maximum radar cross section, h represents the length of a detected object, r represents the radius of the detected object, and λ represents the wavelength of radar waves, the radar cross section of a round rod having a diameter of 0.1 m and a length of 0.5 m is less than 13 dBsm. That is, the tracked vehicle and the round rod have radar cross sections of similar magnitude. Therefore, the radar cross sections cannot be used to identify the tracked vehicle from the stationary object.

Since the existing radar-based vehicle tracking systems have the several problems described above, the present invention provides several embodiments to solve the above problems. The technical solutions of the present invention will be described in detail below with reference to the accompanying drawings and in conjunction with the embodiments.

Figure 4:
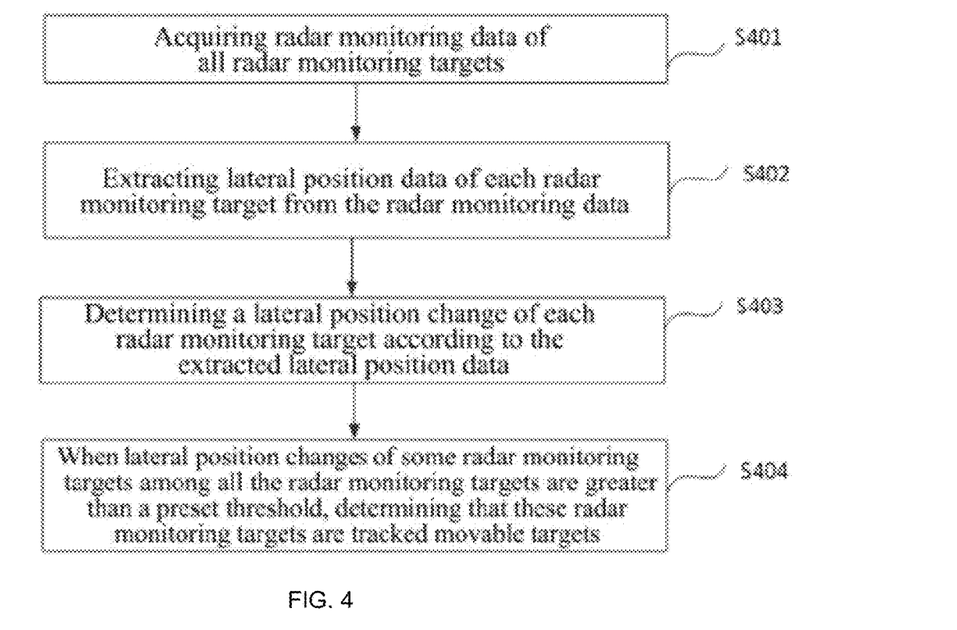
FIG. 4 is a flowchart of a method for tracking a movable target according to an embodiment of the present invention.

According to an embodiment of the present invention, as shown in FIG. 4, a method for tracking a movable target is provided. The method may include the following steps:
- S401, acquiring radar monitoring data of all radar monitoring targets;
- S402, extracting lateral position data of each radar monitoring target from the radar monitoring data;
- S403, determining a lateral position change of each radar monitoring target according to the extracted lateral position data; and
- S404, when the lateral position changes of some radar monitoring targets among all the radar monitoring targets are greater than a preset threshold, determining that these radar monitoring targets are tracked movable targets.

By adopting the above technical solution, since the lateral distribution of reflection points of movable targets to radar waves is wide, whether the radar monitoring targets are movable targets or stationary objects can be accurately determined by extracting the lateral position data of all the radar monitoring targets from the radar monitoring data, determining the lateral position change of each radar monitoring targets according to the extracted lateral position data and comparing the lateral position changes with a preset threshold. In this way, when the technical solution is applied to a tracking field such as vehicle tracking, whether a vehicle should continue to wait until an ahead target starts to move within a reasonable time or detour can be accurately determined.

Figure 5:
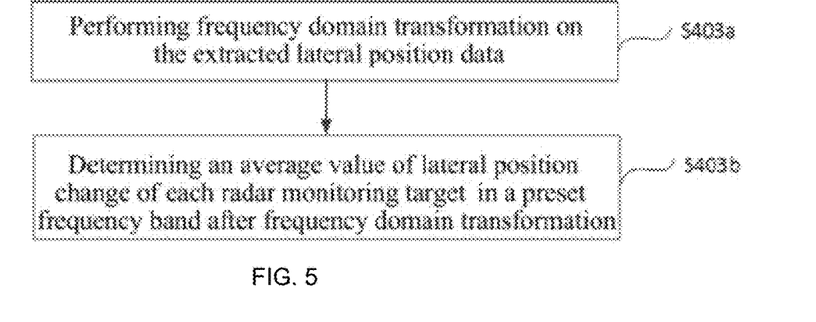
FIG. 5 is a flowchart of a method for tracking a movable target according to another embodiment of the present invention.

In a possible implementation manner, as shown in FIG. 5, the S403 of determining a lateral position change of each radar monitoring target according to the extracted lateral position data may comprise the following steps.

S403a: performing frequency domain transformation on the extracted lateral position data.

Methods such as fast Fourier frequency domain transformation can be adopted to perform frequency domain transformation, for example, the following formula (1) can be used to perform fast Fourier frequency domain transformation:

$$u(k)dt[m/\text{Hz}] = \tag{1}$$
$$FFT\{s(n)[m]\}dt = \sum_{n=1}^{N} s(n)\exp\left(\frac{-i2\pi(n-1)(k-1)}{N}\right)dt.$$

S403b: determining an average value of lateral position change of each radar monitoring target in a preset frequency band after frequency domain transformation.

For example, the following formula (2) can be used to determine the average value of the lateral position changes of each radar monitoring targets in the preset frequency band after frequency domain transformation:

$$u_{ave}(k1:k2)[m] = \tag{2}$$
$$\frac{1}{k2-k1+1}\sum_{k=k1}^{k2}(|u(k)|dt)df = \frac{1}{k2-k1+1}\sum_{k=k1}^{k2}|u(k)|\frac{1}{N}$$

wherein, dt, s(n), N, u(k), df, k1, k2 and $u_{ave}$(k1:k2) in formulas (1) and (2) respectively represent the sampling interval, the lateral position at time ndt, the sampling number, fast Fourier frequency domain transformation of s(n), the frequency interval, the start frequency of the preset frequency band, the end frequency of the preset frequency band, and the average value of lateral position changes, and the unit of the sampling interval can be, for example, seconds or other time units. Generally, the sampling interval of radar can be 10 Hz to 20 Hz, and the maximum frequency can be 5 Hz to 10 Hz depending on the sampling interval. An example of fast Fourier frequency domain transformation is given in Table 1 below.

TABLE 1

| Item | (A) | (B) | Description |
|---|---|---|---|
| Sampling interval (second), dt | 0.1 | 0.1 | |
| Sampling number, N | 100 | 20 | |
| Measuring time (Hz), DT | 10 | 2 | DT = Ndt |
| Frequency resolution (Hz), df | 0.1 | 0.5 | =1/DT |
| Maximum frequency (Hz), $F_{max}$ | 5 | 5 | =1/(2dt) |

Preferably, in S403b, the average value of the lateral position changes of each radar monitoring targets in multiple preset frequency bands after frequency domain transformation can be determined. For example, if $u_{ave}$(k1a:k2a)>$m_{threshold}$(a), and $u_{ave}$(k1b:k2b)>$m_{threshold}$ (b), the radar monitoring targets are determined to be movable targets in the S404, otherwise the radar monitoring targets are stationary objects, wherein two preset frequency bands k1a to k2a and k1b to k2b are adopted here, but those skilled in the art should understand that the two preset frequency bands are just examples, and multiple preset frequency bands can be adopted according to actual application situations in actual application.

Figure 6:
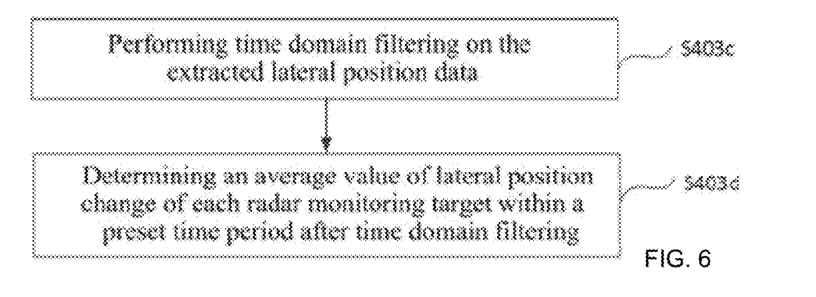
FIG. 6 is a flowchart of a method for tracking a movable target according to yet another embodiment of the present invention.

In a possible implementation manner, as shown in FIG. 6, the S403 of determining a lateral position change of each radar monitoring target according to the extracted lateral position data may also comprise the following steps.

Figure 7A:
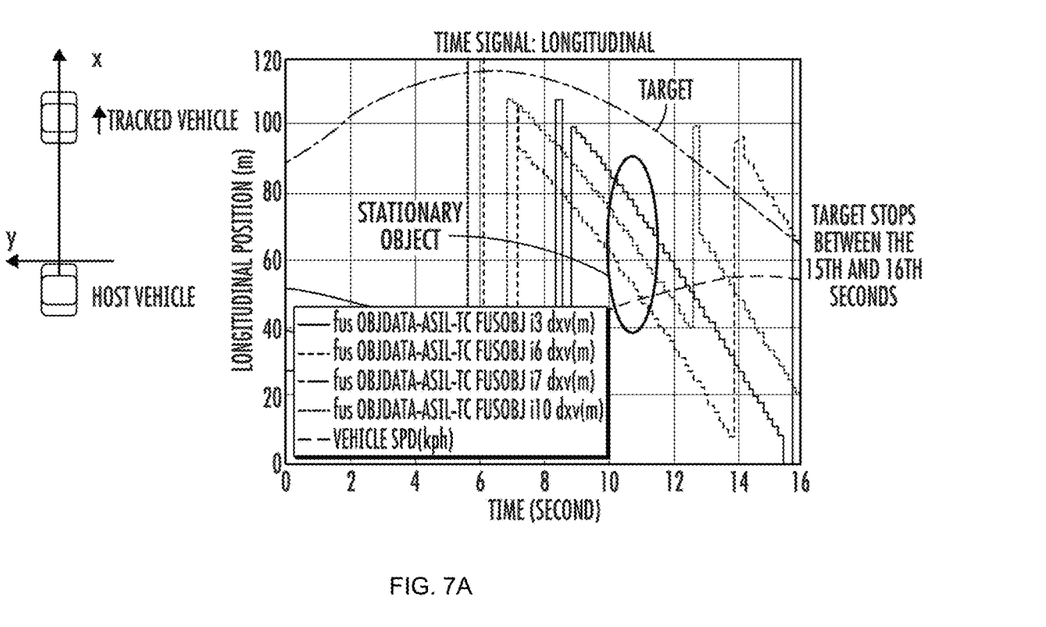
FIGS. 7a-7b are schematic diagrams of longitudinal position monitoring data and lateral position monitoring data according to an embodiment of the present invention.
Figure 7B:
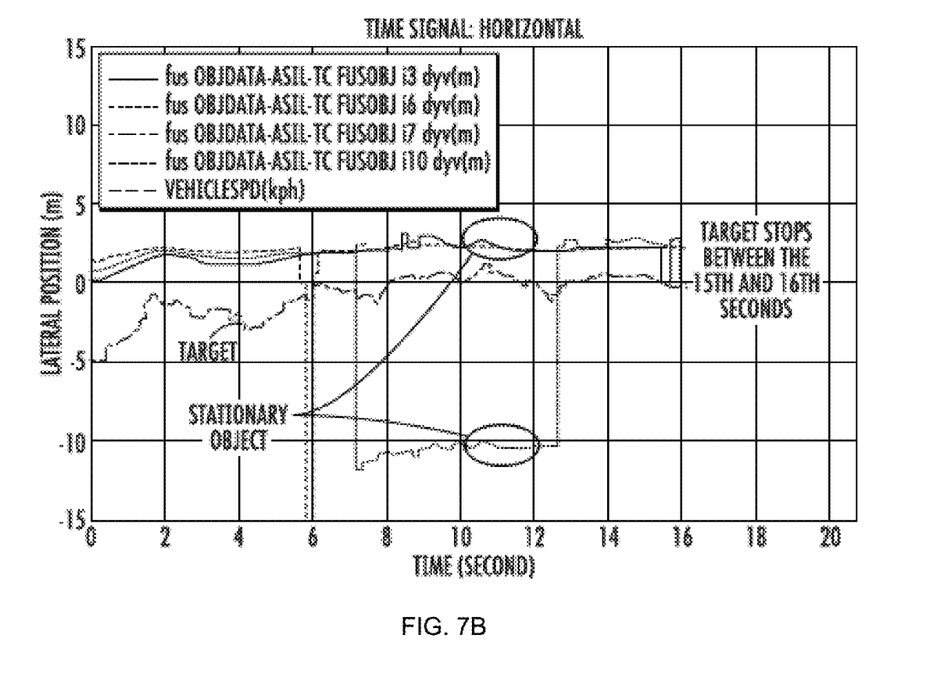

S403c: performing time domain filtering on the extracted lateral position data. Generally, a radar signal reflected from a movable target has greater fluctuation and higher frequency compared with that of a stationary object, as shown in FIG. 7b. That is, if a high-pass filter having a cutoff frequency of, for example, 0.1 Hz to 0.2 Hz is adopted and the amplitude of, for example, fast Fourier spectrum analysis is acquired, the amplitude of the movable target is much larger than the amplitude of the stationary object (referring to FIG. 8b), and further the movable target can be distinguished from the stationary object.

S403d: determining an average value of lateral position changes of each radar monitoring targets within a preset time period after time domain filtering. The S403d is similar to the S403b, except that the S403d is performed in a time domain.

Through the S403c and the S403d, the average value of the lateral position changes of the radar monitoring targets within a preset period of time can be determined, and whether the radar monitoring targets are movable targets or stationary objects can further be determined conveniently.

The method for tracking the movable target according to the present invention is described below in conjunction with a specific embodiment.

A radar is mounted on a guard at the front of a host vehicle at first. The host vehicle travels on a street with railings on the left, the speed of the host vehicle is 52 km/h at the 16th second, a tracked vehicle and the host vehicle travel on the same lane, and the distance between the tracked vehicle and the host vehicle is 58 m. Monitoring data of the longitudinal position (namely the x-axis) of the radar are shown in FIG. 7a, and monitoring data of the lateral position (namely the y-axis) of the radar are shown in FIG. 7b. Referring to FIGS. 7a and 7b, there is no obvious difference between the monitoring data of the longitudinal positions of the tracked vehicle and a stationary object, but there is a significant difference between the monitoring data of the lateral positions of the tracked vehicle and a stationary object, that is, the change of the monitoring data of the lateral position of the tracked vehicle is much larger than that of the monitoring data of the lateral position of the stationary object.

Figure 8A:
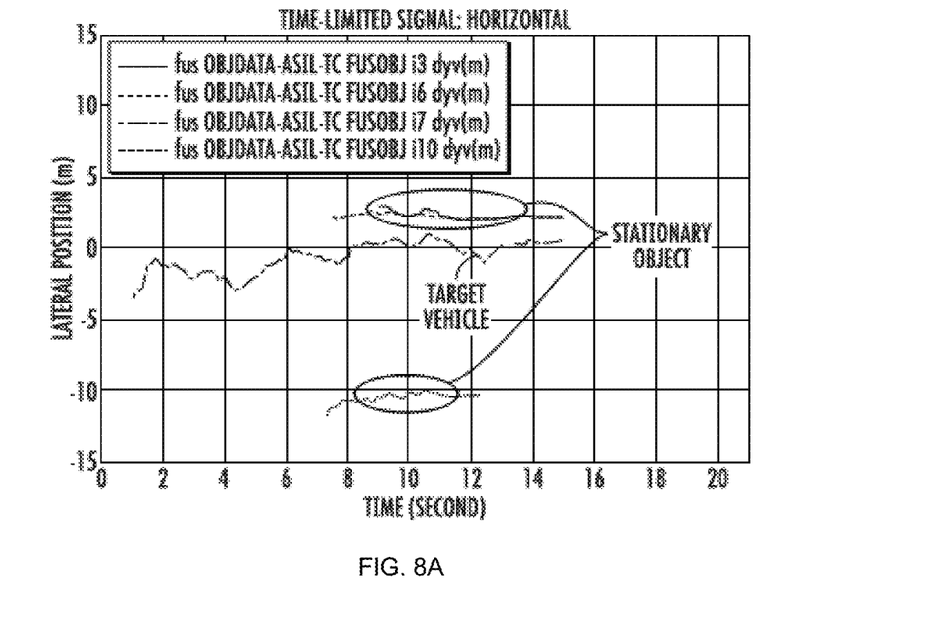
FIGS. 8a-8c are schematic diagrams of results of spectrum analysis on lateral position monitoring data of a tracked vehicle.
Figure 8B:
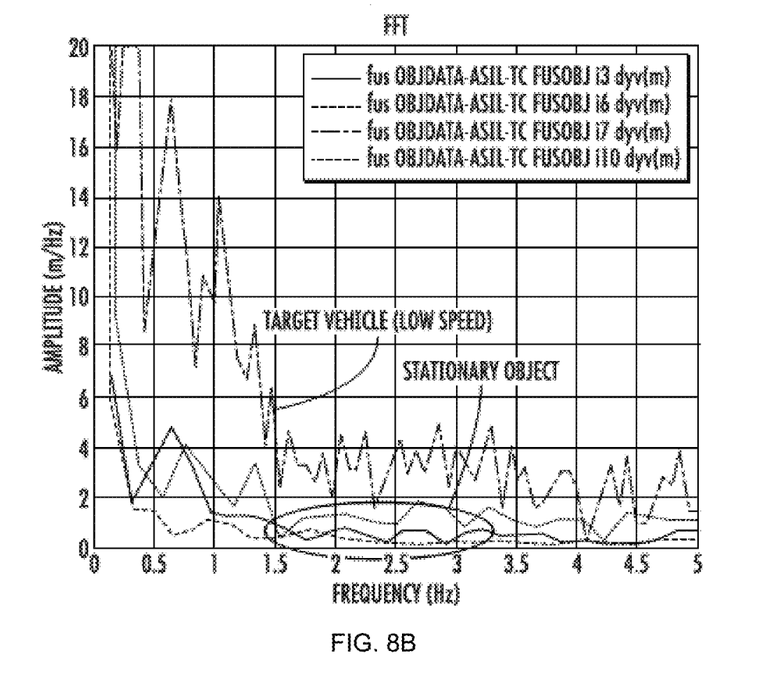
Figure 8C:
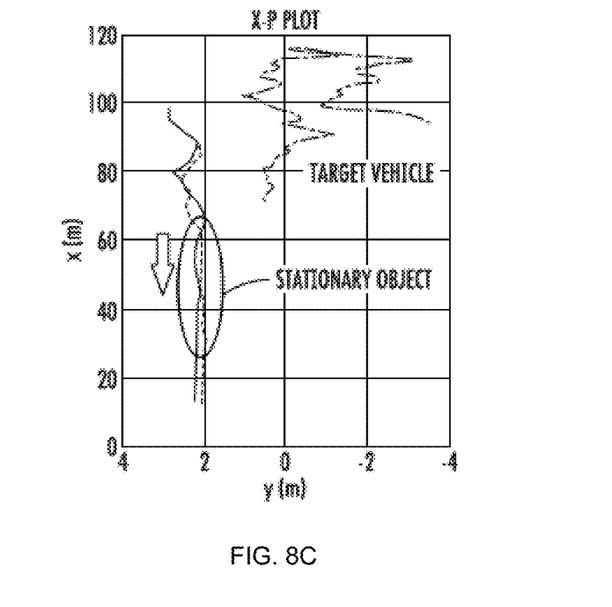

After the monitoring data of the lateral positions of the tracked vehicle and the stationary object are acquired, frequency spectrum analysis is performed on the monitoring data of the lateral positions, and the analysis results are shown in FIGS. 8a to 8c. FIG. 8a shows the change of the lateral positions of the tracked vehicle and the stationary object over time, and the sampling interval dt=0.1 second, thus, the change of the lateral position of the tracked vehicle is much larger than that of the lateral position of the stationary object, and the tracked vehicle is in a low-speed or stopped state between the 15th second and 16th second. FIG. 8b shows a schematic diagram of the lateral position data of the tracked vehicle and the stationary object after fast Fourier transformation, and the amplitude of the tracked vehicle is greater than the amplitude of the stationary object for all frequencies, wherein the amplitude is calculated by the formula (1). FIG. 8c shows the lateral position and an X-Y diagram of fast Fourier transformation of the lateral position.

The lateral motion of the tracked vehicle and the stationary object is analyzed. Generally, the lateral speed of the vehicle is lower than 0.2 m/s. If it is assumed that the lateral position y satisfies a sine wave having an amplitude of 1 m and a frequency of f Hz, the lateral position y, lateral velocity and the maximum lateral velocity can be expressed by the following formulas (3)-(5):

$$y = A\sin(2\pi f t) = \sin(2\pi f t) \quad (3)$$

$$\frac{dy}{dt} = 2\pi f A\cos(2\pi f t) = 2\pi f \cos(2\pi f t) \quad (4)$$

$$\max\left|\frac{dy}{dt}\right| = 2\pi f A = 2\pi f \quad (5)$$

It is further assumed that the maximum lateral velocity is 0.2 m/s and the frequency generated by the lateral motion is 0.032 Hz, the following formulas (6) and (7) can be acquired:

$$2\pi f = 0.2 \quad (6)$$

$$f_m = 0.032 \text{ [Hz]} \quad (7)$$

In order to distinguish the lateral motion of the tracked vehicle from the lateral motion of the stationary object, a frequency greater than $f_m$=0.032 Hz needs to be considered. In addition, when the accuracy of Doppler velocity measurement (for example, 0.12 m/s) and the actual road conditions (for example, the disorder of the road surface, multiple reflections from the surrounding environment, the stationary object, measurement angles and measurement errors) are considered, the Doppler velocity can be applied to distinguish targets having a velocity greater than 1 m/s. Therefore, in the present invention, a target with a longitudinal velocity lower than 1 m/s is defined as a target with low-speed movement.

Therefore, based on the results of the fast Fourier frequency domain analysis shown in FIG. 8b, if the average value of the lateral position changes is greater than a preset threshold, it can be determined that a monitoring target is the tracked vehicle, and if the average value of the lateral position changes is less than the preset threshold, it can be determined that the monitoring target is a stationary object, and thus the stationary object can be distinguished from the tracked vehicle that travels at a low speed or stops traveling.

In addition, it should also be noted that the method for tracking the movable target according to the embodiment of the present invention is not only applicable to distinguishing the movable target that travels at a low speed or stops traveling from a stationary object, but is also applicable to determining that a movable target traveling at a medium or high speed is an actual vehicle so as to support Doppler speed processing results.

Figure 9:
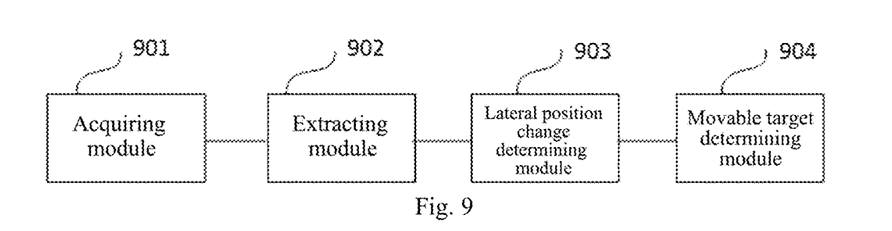
FIG. 9 is a schematic block diagram of a device for tracking a movable target according to an embodiment of the present invention.

According to another embodiment of the present invention, a device for tracking a movable target is provided. As shown in FIG. 9, the device comprises:

an acquiring module 901, used for acquiring radar monitoring data of all radar monitoring targets;

an extracting module 902, used for extracting lateral position data of each radar monitoring target from the radar monitoring data;

a lateral position change determining module 903, used for determining a lateral position change of each radar monitoring target according to the extracted lateral position data; and a movable target determining module 904, used for determining that some radar monitoring targets of all the radar monitoring targets are tracked movable targets when the lateral position changes of the some radar monitoring targets are greater than a preset threshold.

By adopting the above technical solution, since the lateral distribution of reflection points of the movable target to radar waves is wide, whether the radar monitoring targets are movable targets or stationary objects can be accurately determined by extracting the lateral position data of all the radar monitoring targets from the radar monitoring data, determining the lateral position change of each radar monitoring target according to the extracted lateral position data and comparing the lateral position changes with a preset threshold. In this way, when the technical solution is applied to a tracking field such as vehicle tracking, whether a vehicle should continue to wait until an ahead target starts to move within a reasonable time or detour can be accurately determined.

Figure 10:
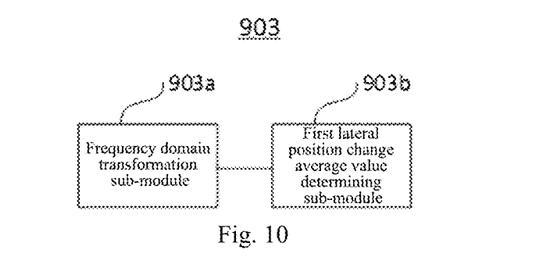
FIG. 10 is a schematic block diagram of a lateral position change determining module of a device for tracking a movable target according to another embodiment of the present invention.

In a possible implementation manner, as shown in FIG. 10, the lateral position change determining module 903 may comprise:

a frequency domain transformation sub-module 903a, used for performing frequency domain transformation on the lateral position data extracted by the extracting module 902; and a first lateral position change average value determining sub-module 903b, used for determining an average value of lateral position changes of each radar monitoring targets in a preset frequency band after the frequency domain transformation.

In a possible implementation manner, the first lateral position change average value determining sub-module 903b is further used for: determining the average value of the lateral position changes of each radar monitoring targets in multiple preset frequency bands after the frequency domain transformation.

Figure 11:
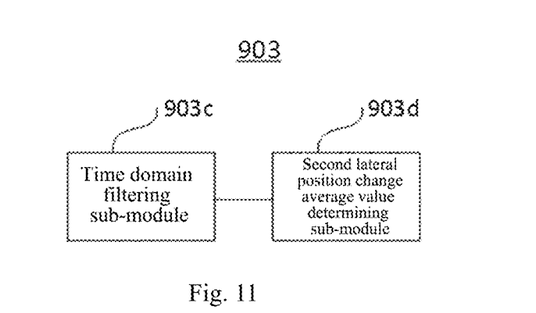
FIG. 11 is another schematic block diagram of a lateral position change determining module of a device for tracking a movable target according to another embodiment of the present invention.

In a possible implementation manner, as shown in FIG. 11, the lateral position change determining module 903 may also comprise:

a time domain filtering sub-module 903c, used for performing time domain filtering on the lateral position data extracted by the extracting module 902; and a second lateral position change average value determining sub-module 903d, used for determining an average value of lateral position changes of each radar monitoring targets within a preset time period after the time domain filtering.

The specific implementation of the operation performed by the modules in the device for tracking the movable target according to the embodiment of the present invention has been described in detail in the method according to the embodiment of the present invention, and will not be repeated here.

Another embodiment of the present invention provides a machine-readable storage medium for storing instructions which are used for enabling a machine to perform the method for tracking the movable target according to any embodiment of the present invention.

Another embodiment of the present invention provides a processor for running a program, wherein the program is used for performing the method for tracking the movable target according to any embodiment of the present invention when being executed.

The above are only preferred embodiments of the present invention and are not intended to limit the present invention. Any modification, equivalent replacement and improvement within the spirit and principle of the present invention should be included in the protection scope of the present invention.

In addition, it should be noted that the specific technical features described in the above specific embodiments can be combined in any suitable manner without contradictions. In order to avoid unnecessary repetition, various embodiments of the present invention in various possible combinations will not be described.

Those skilled in the art can understand that all or part of the steps in the method of the above embodiments can be completed by instructing relevant hardware through a program. The program is stored in a storage medium and includes several instructions to enable a single chip microcomputer, a chip or a processor to perform all or part of the steps of the methods described in the various embodiments of the present application. The foregoing storage medium comprises media which can store program codes, such as a USB flash disk, a mobile hard disk, a read-only memory (ROM), a random access memory (RAM), a magnetic disk or an optical disk.

In addition, various implementations of the embodiments of the present invention may also be optionally combined without violating the ideas of the embodiments of the present invention, and the combinations should also be regarded as the contents disclosed in the embodiments of the present invention.

The invention claimed is:

1. A method for tracking a movable target, comprising:
   acquiring radar monitoring data of all of a plurality of radar monitoring targets;
   extracting lateral position data of each of the plurality of radar monitoring targets from the radar monitoring data, wherein a lateral direction refers to a direction perpendicular to a traveling direction of the radar monitoring target;
   determining lateral position changes of each of the plurality of radar monitoring targets according to the extracted lateral position data by:
   performing frequency domain transformation on the extracted lateral position data, and
   determining an average value of lateral position changes of each of the plurality of radar monitoring targets in multiple preset frequency bands after the frequency domain transformation; and
   classifying the radar monitoring targets based on a comparison of the average value of lateral position changes of one or more radar monitoring targets of all the radar monitoring targets with a preset threshold, wherein the radar monitoring targets are classified as:
   the movable target when the comparison indicates that the average value of lateral position changes is greater than the preset threshold, and
   a stationary object when the comparison indicates that the average value of lateral position changes is not greater than the preset threshold.

2. A non-transitory machine-readable storage medium storing instructions that when executed by one or more processors causes the one or more processors to collectively execute the method for tracking the movable target according to claim 1.

3. A computing device, comprising a memory and a processor, wherein the memory is configured to store a program capable of running on the processor, and the processor is configured to execute the program, wherein the program causes the processor to execute the method for tracking the movable target according to claim 1 when executing the program.

4. A vehicle, comprising the computing device according to claim 3.

* * * * *